United States Patent
Go et al.

(10) Patent No.: US 12,548,302 B1
(45) Date of Patent: Feb. 10, 2026

(54) METHOD FOR GENERATING TRAINING DATA TO BE USED FOR TRAINING MACHINE LEARNING MODEL AND TRAINING DATA GENERATING DEVICE USING THE SAME

(71) Applicant: SUPERB AI CO., LTD., Seoul (KR)

(72) Inventors: Kyeongryeol Go, Seoul (KR); Sangbum Choi, Seoul (KR)

(73) Assignee: SUPERB AI CO., LTD., Seoul (KR)

( * ) Notice: Subject to any disclaimer, the term of this patent is extended or adjusted under 35 U.S.C. 154(b) by 0 days.

(21) Appl. No.: 19/329,217

(22) Filed: Sep. 15, 2025

(30) Foreign Application Priority Data

Aug. 25, 2025 (KR) .................. 10-2025-0118613

(51) Int. Cl.
*G06V 10/774* (2022.01)
*G06F 40/289* (2020.01)
*G06V 10/25* (2022.01)
*G06V 10/26* (2022.01)
*G06V 10/764* (2022.01)
*G06V 20/70* (2022.01)

(52) U.S. Cl.
CPC .......... *G06V 10/774* (2022.01); *G06F 40/289* (2020.01); *G06V 10/25* (2022.01); *G06V 10/26* (2022.01); *G06V 10/764* (2022.01); *G06V 20/70* (2022.01)

(58) Field of Classification Search
CPC .............................. G06F 40/289; G06V 20/70
See application file for complete search history.

(56) References Cited

U.S. PATENT DOCUMENTS

| 10,540,572 B1 | 1/2020 | Kim et al. |
| 2023/0154213 A1* | 5/2023 | Gao ............... G06V 10/25 382/159 |

(Continued)

FOREIGN PATENT DOCUMENTS

| JP | 6853560 B2 | 3/2021 |
| KR | 10-2023-0161950 A | 11/2023 |

(Continued)

OTHER PUBLICATIONS

KR Office Action dated Dec. 9, 2025 as received in Application No. 10-2025-0118613.

*Primary Examiner* — Edward Park
(74) *Attorney, Agent, or Firm* — Maschoff Brennan

(57) ABSTRACT

There is provided a method for generating training data for training a machine learning model by a training data generating device, comprising: (a) in response to acquiring an original image, performing sub-processes of: generating an image caption for the original image, extracting at least one noun phrase from the image caption, and performing an open vocabulary object detection on the original image, to thereby generate at least one first pseudo label and performing sub-processes of: extracting at least one proposal from the original image, generating at least one region description, and generating at least one second pseudo label; and (b) filtering the at least one first pseudo label and the at least one second pseudo label according to a preset filtering condition, to thereby generate at least one integrated pseudo label, and generating the training data by annotating the original image with the at least one integrated pseudo label.

12 Claims, 7 Drawing Sheets

(56) References Cited

U.S. PATENT DOCUMENTS

| | | | |
|---|---|---|---|
| 2023/0252774 A1* | 8/2023 | Kuen | G06T 7/70 |
| | | | 382/157 |
| 2023/0281858 A1* | 9/2023 | Schulter | G06V 10/82 |
| | | | 382/103 |
| 2023/0316536 A1* | 10/2023 | Lee | G06T 3/02 |
| 2024/0153291 A1 | 5/2024 | Zhou | |
| 2024/0290119 A1 | 8/2024 | Fashandi | |
| 2024/0378868 A1 | 11/2024 | Iyer et al. | |
| 2024/0428566 A1* | 12/2024 | Huang | G06V 10/62 |
| 2025/0165710 A1 | 5/2025 | Moon et al. | |
| 2025/0265826 A1 | 8/2025 | Maniadis Metaxas et al. | |
| 2025/0316061 A1* | 10/2025 | Kara | G06N 3/08 |

FOREIGN PATENT DOCUMENTS

| | | |
|---|---|---|
| KR | 10-2024-0114150 | 7/2024 |
| KR | 10-2713235 | 10/2024 |
| KR | 102713202 B1 | 10/2024 |
| KR | 10-2025-0075209 A | 5/2025 |
| KR | 10-2025-0078296 A | 6/2025 |

* cited by examiner

METHOD FOR GENERATING TRAINING DATA TO BE USED FOR TRAINING MACHINE LEARNING MODEL AND TRAINING DATA GENERATING DEVICE USING THE SAME

CROSS REFERENCE TO RELATED APPLICATION

This application claims the benefit of priority to Korean Patent Application No. 10-2025-0118613, filed on Aug. 25, 2025, the entire contents of which being incorporated herein by reference.

FIELD OF THE DISCLOSURE

The present disclosure relates to a method for generating training data to be used for training a machine learning model and a training data generating device using the same, and more specifically, to a method for generating the training data through auto-labeling by using a combination of a Vision Language Model (VLM) and a Vision Foundation Model (VFM) and the training data generating device using the same.

BACKGROUND OF THE DISCLOSURE

In general, there are two types of labeling methods for generating training data: a manual labeling in which a labeler manually creates a label for an image, and an auto-labeling in which a trained machine learning model automatically creates the label for the image. Recently, as a performance of the machine learning model has improved, the auto-labeling method is widely used for generating the training data.

The process of generating the training data using the method of auto-labeling involves (i) training an object detection model such as a Vision Language Model (VLM) and a Vision Foundation Model (VFM) by using a small amount of manually labeled high-quality training data, then (ii) predicting objects for an unlabeled data set by using the trained object detection model, i.e., automatically assigning information such as an object location and a class to an unlabeled image by using the trained objection detection model such as the VLM and the VFM, thereby generating a pseudo label or an auto label and (iii) annotating the unlabeled data set with the pseudo label or the auto label to generate a training data set. Accordingly, the training data set generated through the auto-labeling may be reused to train the object detection model, and if necessary, a quality verification algorithm or a mislabel detection algorithm are used to improve a quality of the label. By repeating this process, the object detection model performing the auto-labeling evolves as it adapts to increasingly larger data sets and various environments.

However, in the conventional auto-labeling method as above, if initial manually labeled training data is small or of low quality, a first auto-labeled result will be inaccurate, and false positives/false negatives of the object detection model will accumulate during the subsequent repetitive training process, and incorrect pseudo labels or incorrect auto labels may be repeatedly included in the training data. In this case, there is a risk that the object detection model will learn incorrect patterns, and in the large-scale auto-labeling process, a mislabel or a noise are likely to be mixed in. However, it is difficult for humans to verify them one by one. In special domains such as industrial sites, additional quality control is required due to numerous details or rare events that the general VLM or VFM misses.

Therefore, the present applicant proposes a novel method for constructing a large-scale, high-quality training data set.

SUMMARY OF THE DISCLOSURE

It is an object of the present disclosure to solve all the aforementioned problems.

It is another object of the present disclosure to generate large-scale, high-quality training data by using a combination of Vision Language Model and a Vision Foundation Model.

It is still another object of the present disclosure to prevent an accumulation of incorrect labels through a filtering and a verification for outputs of the Vision Language Model and the Vision Foundation Model.

It is still yet another object of the present disclosure to enable rapid construction of high-quality, large-scale multi-domain data sets without a manual work, thereby reducing a cost and a time of the data construction in actual industrial and research fields.

The characteristic configurations of the present disclosure for achieving the object of the present disclosure as described above are as follows.

In accordance with one aspect of the present disclosure, there is provided a method for generating training data to be used for training a machine learning model, comprising: (a) in response to acquiring an original image, (i) performing, by a training data generating device, sub-processes of: generating an image caption for the original image by captioning the original image, extracting at least one noun phrase from the image caption, and performing an open vocabulary object detection on the original image by referring to the at least one noun phrase, to thereby generate at least one first pseudo label including at least one first category name and at least one first bounding box and (ii) performing, by the training data generating device, sub-processes of: extracting at least one proposal corresponding to at least one object from the original image, generating at least one region description corresponding to the at least one proposal, and generating at least one second pseudo label including at least one second category name and at least one second bounding box; and (b) filtering, by the training data generating device, the at least one first pseudo label and the at least one second pseudo label according to a preset filtering condition, to thereby generate at least one integrated pseudo label, and generating, by the training data generating device, the training data by annotating the original image with the at least one integrated pseudo label.

As one example, at the step of (b), the training data generating device filters the at least one first pseudo label and the at least one second pseudo label under at least one filtering condition among a first filtering condition, a second filtering condition, and a third filtering condition, wherein the first filtering condition is applied by calculating, for each of the at least one first pseudo label and the at least one second pseudo label, image-text align scores which include first align scores between the first category name and a first crop image corresponding to the first bounding box and second align scores between the second category name and a second crop image corresponding to the second bounding box, and removing at least one pseudo label corresponding to specific image-text align scores lower than or equal to a preset threshold score among the image-text align scores, wherein the second filtering condition is applied by removing, for each of the at least one first pseudo label and the at least one second pseudo label, at least one pseudo label whose bounding box size is smaller than or equal to a preset threshold size, and wherein the third filtering condition is applied by removing, for each of the at least one first pseudo label and the at least one second pseudo label, at least one pseudo label whose IOU between the first bounding box and the second bounding box is greater than or equal to a preset threshold IOU.

As one example, at the step of (b), the training data generating device calculates the image-text align scores through any one of a CLIP (Contrastive Language-Image Pre-training) model, a SigLIP (Sigmoid Loss for Language Image Pre-training)-2 model, a GLIP (Grounded Language-Image Pre-training) model, and a BLIP (Bootstrapping Language-Image Pre-training)-2 model under the first filtering condition.

As one example, at the step of (b), when filtering, according to the third filtering condition, a pseudo label corresponding to one of a specific first bounding box and a specific second bounding box, the IOU between the specific first bounding box and the specific second bounding box being greater than or equal to the preset threshold IOU, the training data generating device inserts one specific pseudo label corresponding to one specific bounding box, among the specific first bounding box and the specific second bounding box, which is matched with a task of the machine learning model into the at least one integrated pseudo label, by referring to a specific first category name corresponding to the specific first bounding box and a specific second category name corresponding to the specific second bounding box, and removes another specific pseudo label corresponding to another specific bounding box, among the specific first bounding box and the specific second bounding box, wherein the machine learning model is a model to be trained by using the training data.

As one example, at the step of (a), in performing the sub-process of generating the at least one first pseudo label, the training data generating device extracts the image caption for the original image through a first vision language model, extracts the at least one noun phrase from the image caption through a natural language processing model, and inputs the at least one noun phrase and the original image into an open vocabulary object detection model, to thereby instruct the open vocabulary object detection model to detect the at least one object corresponding to the at least one noun phrase in the original image.

As one example, at the step of (a), in performing the sub-process of generating the at least one second pseudo label, the training data generating device inputs the original image into an object proposal model, to thereby instruct the object proposal model to extract the at least one proposal corresponding to the at least one object from the original image, and inputs the at least one proposal and the original image into a second vision language model, to thereby instruct the second vision language model to generate the at least one region description for the at least one proposal.

In accordance with another aspect of the present disclosure there is provided a training data generating device for generating training data to be used for training a machine learning model, comprising: at least one memory which saves instructions for generating the training data to be used for training the machine learning model; and at least one processor configured to generate the training data to be used for training the machine learning model according to the instructions stored in the memory to perform processes of: (I) in response to acquiring an original image, (i) performing sub-processes of: generating an image caption for the original image by captioning the original image, extracting at least one noun phrase from the image caption, and performing an open vocabulary object detection on the original image by referring to the at least one noun phrase, to thereby generate at least one first pseudo label including at least one first category name and at least one first bounding box and (ii) performing sub-processes of: extracting at least one proposal corresponding to at least one object from the original image, generating at least one region description corresponding to the at least one proposal, and generating at least one second pseudo label including at least one second category name and at least one second bounding box; and (II) filtering the at least one first pseudo label and the at least one second pseudo label according to a preset filtering condition, to thereby generate at least one integrated pseudo label, and generating the training data by annotating the original image with the at least one integrated pseudo label.

As one example, at the process of (II), the processor filters the at least one first pseudo label and the at least one second pseudo label under at least one filtering condition among a first filtering condition, a second filtering condition, and a third filtering condition, wherein the first filtering condition is applied by calculating, for each of the at least one first pseudo label and the at least one second pseudo label, image-text align scores which include first align scores between the first category name and a first crop image corresponding to the first bounding box and second align scores between the second category name and a second crop image corresponding to the second bounding box, and removing at least one pseudo label corresponding to specific image-text align scores lower than or equal to a preset threshold score among the image-text align scores, wherein the second filtering condition is applied by removing, for each of the at least one first pseudo label and the at least one second pseudo label, at least one pseudo label whose bounding box size is smaller than or equal to a preset threshold size, and wherein the third filtering condition is applied by removing, for each of the at least one first pseudo label and the at least one second pseudo label, at least one pseudo label whose IOU between the first bounding box and the second bounding box is greater than or equal to a preset threshold IOU.

As one example, at the process of (II), the processor calculates the image-text align scores through any one of a CLIP (Contrastive Language-Image Pre-training) model, a SigLIP (Sigmoid Loss for Language Image Pre-training)-2 model, a GLIP (Grounded Language-Image Pre-training) model, and a BLIP (Bootstrapping Language-Image Pre-training)-2 model under the first filtering condition.

As one example, at the process of (II), when filtering, according to the third filtering condition, a pseudo label corresponding to one of a specific first bounding box and a specific second bounding box, the IOU between the specific first bounding box and the specific second bounding box being greater than or equal to the preset threshold IOU, the processor inserts one specific pseudo label corresponding to one specific bounding box, among the specific first bounding box and the specific second bounding box, which is matched with a task of the machine learning model into the at least one integrated pseudo label, by referring to a specific first category name corresponding to the specific first bounding box and a specific second category name corresponding to the specific second bounding box, and removes another specific pseudo label corresponding to another specific bounding box, among the specific first bounding box and the specific second bounding box, wherein the machine learning model is a model to be trained by using the training data.

As one example, at the process of (I), in performing the sub-process of generating the at least one first pseudo label, the processor extracts the image caption for the original image through a first vision language model, extracts the at least one noun phrase from the image caption through a natural language processing model, and inputs the at least one noun phrase and the original image into an open vocabulary object detection model, to thereby instruct the open vocabulary object detection model to detect the at least one object corresponding to the at least one noun phrase in the original image.

As one example, at the process of (I), in performing the sub-process of generating the at least one second pseudo label, the processor inputs the original image into an object proposal model, to thereby instruct the object proposal model to extract the at least one proposal corresponding to the at least one object from the original image, and inputs the at least one proposal and the original image into a second vision language model, to thereby instruct the second vision language model to generate the at least one region description for the at least one proposal.

In addition, in accordance with still another aspect of the present disclosure there is further provided a computer-readable recording medium for recording a computer program for executing the method of the present disclosure.

BRIEF DESCRIPTION OF THE DRAWINGS

The accompanying drawings used to explain example embodiments of the present disclosure are only part of example embodiments of the present disclosure and other drawings may be obtained based on the drawings by those skilled in the art of the present disclosure without inventive work.

DETAILED DESCRIPTION OF THE PREFERRED EMBODIMENTS

Figure 1:
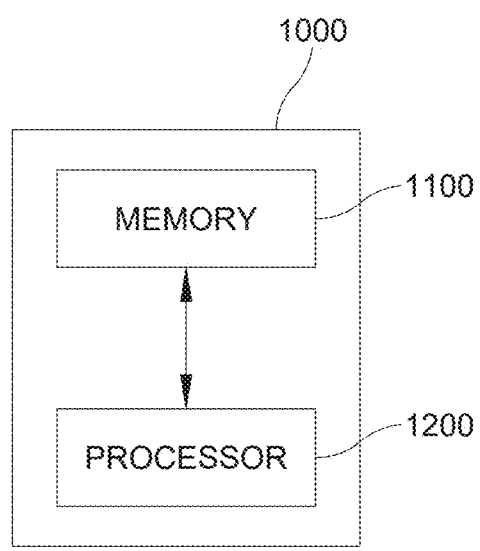
FIG. 1 is a drawing schematically illustrating a training data generating device for generating training data to be used for training a machine learning model in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present disclosure to be carried out easily, the example embodiments of the present disclosure by referring to attached diagrams will be explained in detail as shown below.

FIG. 1 is a drawing schematically illustrating a training data generating device for generating training data to be used for training a machine learning model in accordance with one example embodiment of the present disclosure. By referring to FIG. 1, the training data generating device 1000 may include a memory 1100 in which instructions for generating the training data to be used for training the machine learning model are stored, and a processor 1200 for generating the training data to be used for training a deep learning model according to the instructions stored in the memory 1100.

Specifically, the training data generating device 1000 may typically achieve a desired system performance by using combinations of at least one computing device, e.g., a computer processor, a memory, a storage, an input device, an output device, or any other conventional computing components, an electronic communication device such as a router or a switch, an electronic information storage system such as a network-attached storage (NAS) device and a storage area network (SAN), and at least one computer software, e.g., any instructions that allow the computing device to function in a specific way, but the present disclosure is not limited thereto.

Also, the processor 1200 of the training data generating device 1000 may include a hardware configuration of MPU (Micro Processing Unit) or CPU (Central Processing Unit), cache memory, data bus, etc. Additionally, any OS (operating system) and software configuration of applications that achieve specific purposes may further be included.

However, it does not exclude the case of the training data generating device 1000 including an integrated processor which is an integrated form of the medium, the processor, and the memory for performing the present disclosure.

Meanwhile, according to the instructions stored in the memory 1100, the processor 1200 of the training data generating device 1000 may perform processes of, in response to acquiring an original image, (i) performing sub-processes of: generating an image caption for the original image by captioning the original image, extracting at least one noun phrase from the image caption, and performing an open vocabulary object detection on the original image by referring to the at least one noun phrase, to thereby generate at least one first pseudo label including at least one first category name and at least one first bounding box and (ii) performing sub-processes of: extracting at least one proposal corresponding to at least one object from the original image, generating at least one region description corresponding to the at least one proposal, and generating at least one second pseudo label including at least one second category name and at least one second bounding box. And then, according to the instructions stored in the memory 1000, the processor 1200 of the training data generating device 1000 may perform a process of filtering the at least one first pseudo label and the at least one second pseudo label according to a preset filtering condition, to thereby generate at least one integrated pseudo label, and generating the training data by annotating the original image with the at least one integrated pseudo label.

Figure 2:
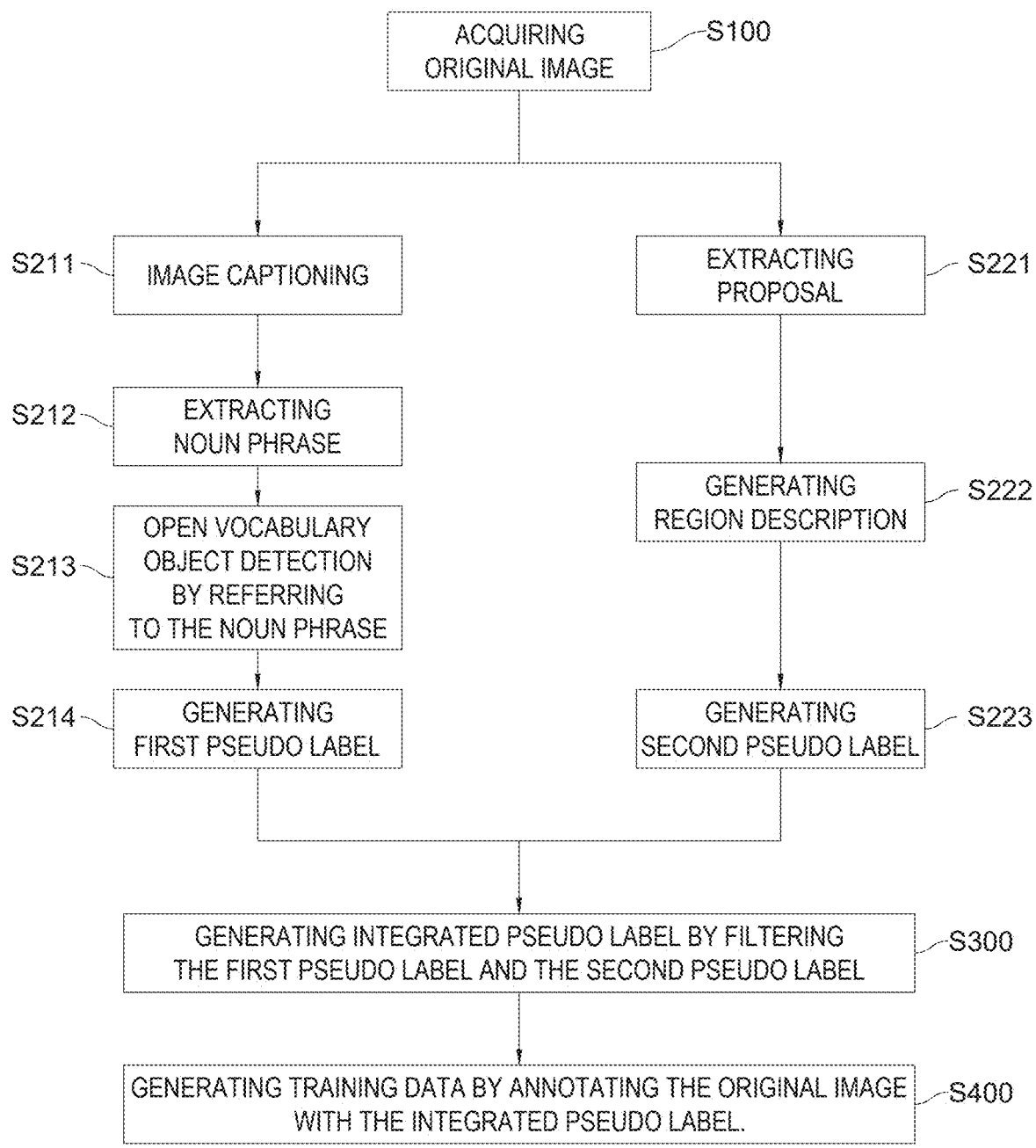
FIG. 2 is a drawing schematically illustrating a method for generating the training data to be used for training the machine learning model in accordance with one example embodiment of the present disclosure.

The method of generating the training data to be used for training the machine learning model in the training data generating device 1000 configured in this manner is described in more detail by referring to FIG. 2 as follows.

First, the training data generating device 1000 may acquire the original image required for generating the training data at a step of S100.

For example, the original image may be acquired from an unlabeled data set that stores unlabeled images collected for generating the training data. Herein, the unlabeled data set may be stored in a storage device or a cloud storage linked to the training data generating device 1000, but the present disclosure is not limited thereto, and may be stored in various storage environments capable of recording data.

Then, the training data generating device 1000 may perform captioning for the original image to thereby generate an image caption for the original image at a step of S211.

For example, the training data generating device 1000 may extract the image caption for the original image through a first vision language model. Herein, the image caption can be assumed to be, for example, "there are a lot of men playing an acoustic guitar," which is used to derive category names of "man" and "acoustic guitar" corresponding to solid boxes in FIG. 3. Also, the first vision language model may include CLIP (Contrastive Language-Image Pre-training), BLIP (Bootstrapping Language-Image Pre-training), InternVL (large-scale vision-language foundation model), etc., but the present disclosure is not limited thereto, and may include various multimodal models that perform the image captioning.

Thereafter, the training data generating device 1000 may extract at least one noun phrase from the image caption at a step of S212.

For example, the training data generating device 1000 may extract at least one noun phrase through a natural language processing model, and the extracted noun phrases may be coarse grained noun phrases. Herein, the extracted noun phrases may be, for example, "man", "acoustic guitar", etc., corresponding to the solid boxes in FIG. 3. Also, the natural language processing model may include spaCy, WordNet and the like, but the present disclosure is not limited thereto, and may include various models for processing the natural language. In addition, the noun phrases may include object attributes such as a noun, a color, a shape, a material and the like, that represent an object.

Also, the training data generating device 1000 may perform an open vocabulary object detection on the original image by referring to the at least one noun phrase, at a step of S213, to thereby perform a sub-process of generating the at least one first pseudo label including the at least one first category name and the at least one first bounding box, at a step of S214. Herein, the first category name and the first bounding box may be, for example, the solid boxes and texts corresponding to the solid boxes in FIG. 3.

For example, the training data generating device 1000 may input the at least one noun phrase and the original image into an open vocabulary object detection model, to thereby instruct the open vocabulary object detection model to detect the at least one object corresponding to the at least one noun phrase in the original image, i.e., to predict the location, for example, the bounding box, of the at least one object corresponding to the at least one noun phrase. Accordingly, the at least one first pseudo label including the at least one first category name, which is the at least one noun phrase, and the at least one first bounding box corresponding to the at least one first category name may be generated. Herein, the open vocabulary object detection model may include at least some of a Grounding-DINO model, a zero-shot model, etc., but the present disclosure is not limited thereto, and may include various models that perform an object detection in an open vocabulary manner.

In addition, the training data generating device 1000 which acquired the original image at the step of S100 may extract at least one proposal corresponding to the at least one object from the original image at a step of S221.

For example, the training data generating device 1000 may input the original image into an object proposal model, to thereby instruct the object proposal model to extract the at least one proposal corresponding to the at least one object from the original image. Herein, the proposal may be, for example, dotted boxes in FIG. 3. Also, the object proposal model may include a UPN (Universal Proposal Network), and the UPN can extract coarse grained proposals corresponding to instance-level objects and fine grained proposals corresponding to part-level objects.

In addition, the training data generating device 1000 may perform sub-processes of generating at least one region description corresponding to the at least one proposal at a step of S222 and generating the at least one second pseudo label including the at least one second category name and the at least one second bounding box at a step of S223. Herein, the region descriptions may be, for example, "old man", "brown acoustic guitar" and the like corresponding to the dotted boxes in FIG. 3, and may be the descriptions of objects in regions corresponding to the proposals.

For example, the training data generating device 1000 may input the at least one proposal and the original image into a second vision language model, to thereby instruct the second vision language model to generate the at least one region description for the at least one proposal, and generate the at least one second pseudo label including at least one bounding box that is the at least one proposal, and the at least one second category name that is the at least one region description corresponding to the at least one bounding box. Herein, the second vision language model may include a ChatRex model. Also, each of the region descriptions outputted from the ChatRex may be each of fine-grained phrases that is more detailed and contextual sentence for each of the proposals.

In response to generating the at least one first pseudo label and the at least one second pseudo label for the original image by the method as above, the training data generating device 1000 may filter the at least one first pseudo label and the at least one second pseudo label according to a preset filtering condition, to thereby generate at least one integrated pseudo label at a step of S300.

Herein, the training data generating device 1000 may filter the at least one first pseudo label and the at least one second pseudo label under at least one filtering condition among a first filtering condition, a second filtering condition, and a third filtering condition. Herein, the first filtering condition is applied by calculating, for each of the at least one first pseudo label and the at least one second pseudo label, image-text align scores which include first align scores between the first category names and first crop images corresponding to the first bounding boxes and second align scores between the second category names and second crop images corresponding to the second bounding boxes, and removing at least one pseudo label corresponding to at least one specific image-text align score lower than or equal to a preset threshold score among the image-text align scores, wherein the first align scores are, for example, for how well the first category names describe the objects on the first crop images and the second align scores are, for example, for how well the second category names describe the objects on the second crop images. Further, herein the second filtering condition is applied by removing, for each of the at least one first pseudo label and the at least one second pseudo label, at least one pseudo label whose bounding box size is smaller than or equal to a preset threshold size. Furthermore, herein the third filtering condition is applied by removing, for each of the at least one first pseudo label and the at least one second pseudo label, at least one pseudo label whose IOU between the first bounding box and the second bounding box is greater than or equal to a preset threshold IOU.

For example, a process of generating the at least one integrated pseudo label by filtering the at least one first pseudo label and the at least one second pseudo label under the first filtering condition, the second filtering condition, and the third filtering condition is provided by referring to FIG. 3 to FIG. 7 as follows. For reference, in FIG. 3 to FIG. 7, the solid boxes may represent the first pseudo labels, and the dotted boxes may represent the second pseudo labels.

Figure 3:
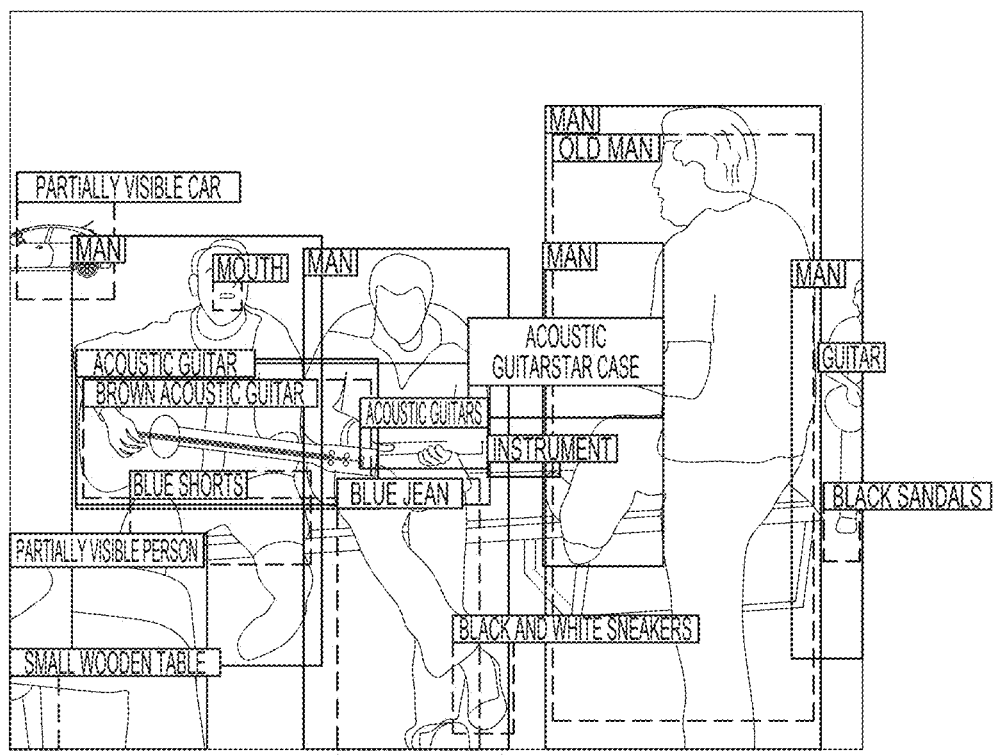
FIG. 3 is a drawing exemplary illustrating first pseudo labels and second pseudo labels generated in an original image in the method for generating the training data to be used for training the machine learning model in accordance with one example embodiment of the present disclosure.
Figure 4:
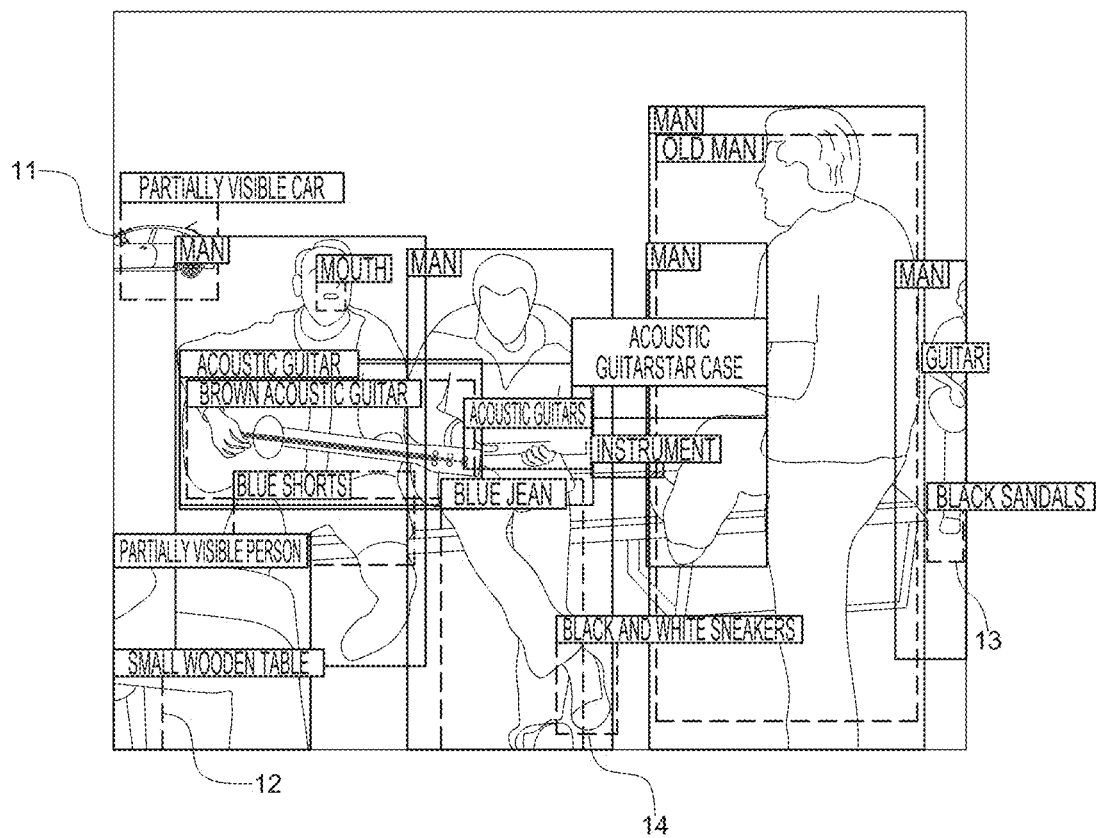
FIG. 4 is a drawing schematically illustrating a state in which a first filtering is performed by using image-text align scores on the first pseudo labels and the second pseudo labels of FIG. 3 in the method for generating the training data to be used for training the machine learning model in accordance with one example embodiment of the present disclosure.

In a state where the first pseudo labels and the second pseudo labels are generated by auto-labeling the original image as shown in FIG. 3, the training data generating device 1000 may calculate each of the image-text align scores for each of the first pseudo labels and the second pseudo labels through any one of a CLIP (Contrastive Language-Image Pre-training) model, a SigLIP (Sigmoid Loss for Language Image Pre-training)-2 model, a GLIP (Grounded Language-Image Pre-training) model, and a BLIP (Bootstrapping Language-Image Pre-training)-2 model under the first filtering condition, and remove pseudo labels of "partially visible car" 11, "small wooden table" 12, "black sandals" 13, and "black and white sneakers" 14 that are found to have image-text alignment scores below the preset threshold score as shown in FIG. 4.

Figure 5:
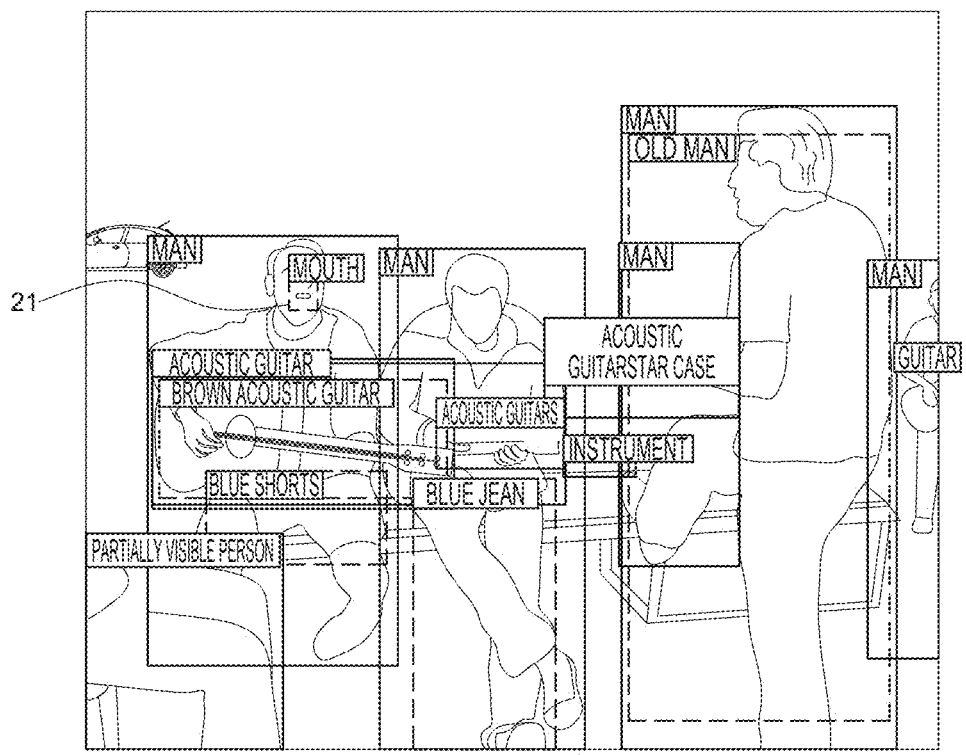
FIG. 5 is a drawing schematically illustrating a state in which a second filtering is performed by using bounding box sizes on the first pseudo labels and the second pseudo labels of FIG. 3 in the method for generating the training data to be used for training the machine learning model in accordance with one example embodiment of the present disclosure.

Also, as shown in FIG. 5, the training data generating device 1000 may detect each of the sizes of the bounding boxes of each of the first pseudo labels and the second pseudo labels under the second filtering condition, and may remove a pseudo label of "mouth" 21 whose bounding box size is confirmed to be less than or equal to the threshold size.

Figure 6:
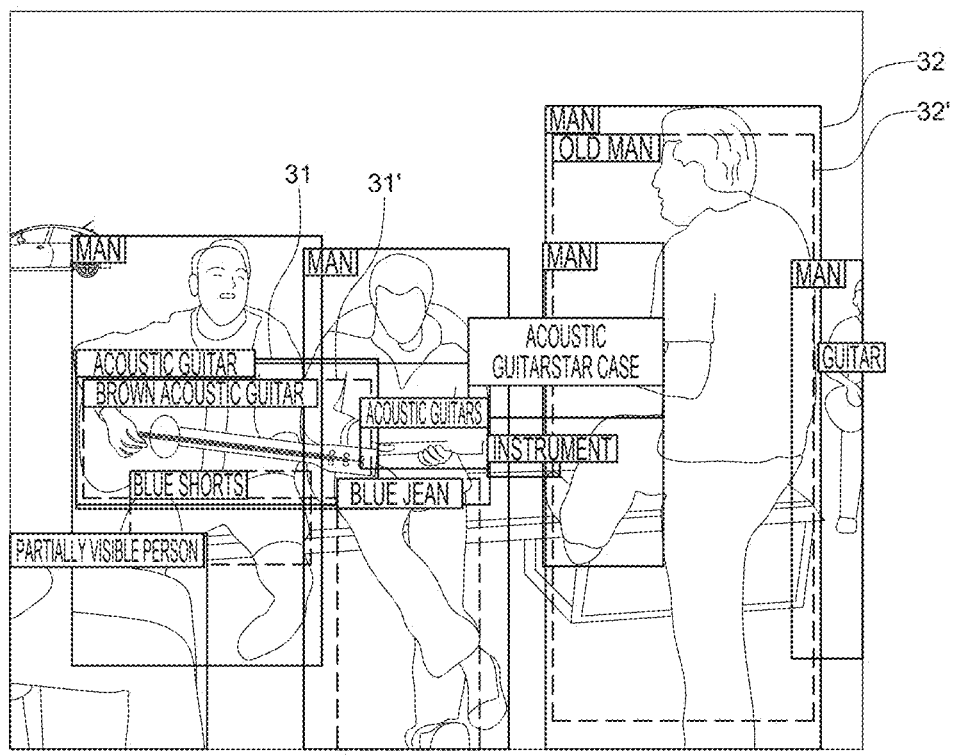
FIG. 6 is a drawing schematically illustrating a state in which a third filtering is performed by using IOUs on the first pseudo labels and the second pseudo labels of FIG. 3 in the method for generating the training data to be used for training the machine learning model in accordance with one example embodiment of the present disclosure.
Figure 7:
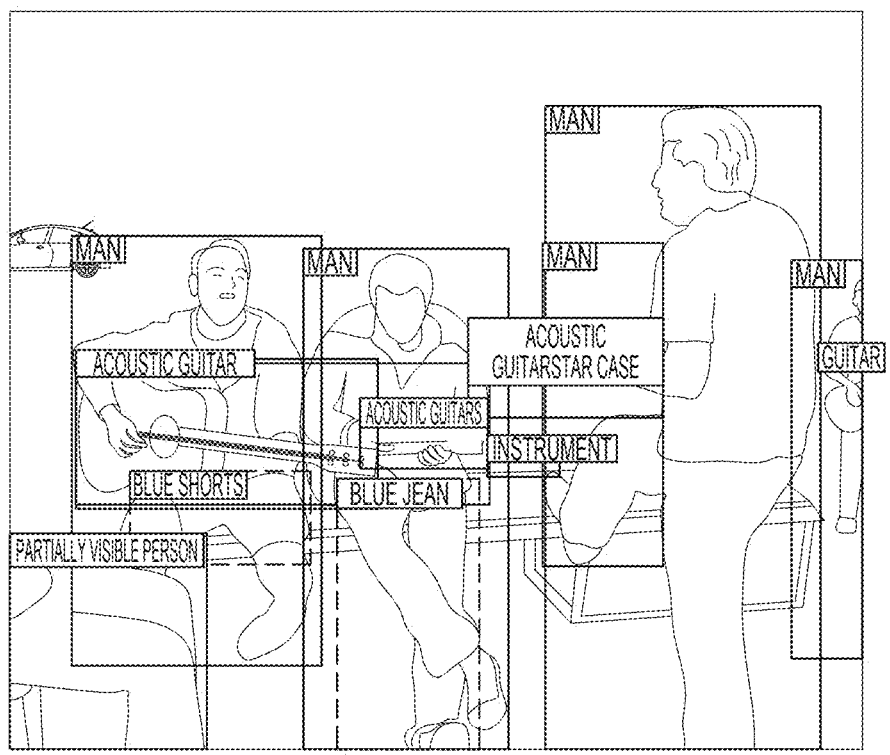
FIG. 7 is a drawing schematically illustrating integrated pseudo labels acquired by performing the first filtering to the third filtering on the first pseudo labels and the second pseudo labels of FIG. 3 in the method for generating the training data to be used for training the machine learning model in accordance with one example embodiment of the present disclosure.

Thereafter, as shown in FIG. 6, the training data generating device 1000 may detect pairs of the first pseudo labels and the second pseudo labels, such as a pair of "acoustic guitar" 31 with "brown acoustic guitar" 31', and a pair of "man" 32 with "older man" 32', which overlap each other, i.e., whose IOUs of the bounding boxes exceed the preset threshold IOU, and may remove the pseudo labels of "brown acoustic guitar" 31' and "older man" 32' under the third filtering condition, to thereby generate the at least one integrated pseudo label by filtering out the at least one first pseudo label and the at least one second pseudo label as shown in FIG. 7.

Herein, when filtering out, according to the third filtering condition, a pseudo label corresponding to one of a specific first bounding box and a specific second bounding box, the IOU between the specific first bounding box and the specific second bounding box being greater than or equal to the preset threshold IOU, the training data generating device 1000 inserts one specific pseudo label corresponding to one specific bounding box, among the specific first bounding box and the specific second bounding box, which is matched with a task of the machine learning model into the at least one integrated pseudo label, by referring to a specific first category name corresponding to the specific first bounding box and a specific second category name corresponding to the specific second bounding box, and removes another specific pseudo label corresponding to another specific bounding box, among the specific first bounding box and the specific second bounding box.

That is, as described by referring to FIG. 6, among the pairs of the first pseudo labels and the second pseudo labels which overlap each other, i.e., the pair of "acoustic guitar" 31 with "brown acoustic guitar" 31', and the pair of "man" 32 with "older man" 32', if the machine learning model to be trained simply requires classes of the objects, the second pseudo labels "brown acoustic guitar" 31' and "older man" 32' may be removed and the first pseudo labels "acoustic guitar" 31 and "man" 32 may be inserted into the integrated pseudo labels. Otherwise, if the machine learning model to be trained requires attributes of the objects, and the first pseudo labels "acoustic guitar" 31 and "man" 32 may be removed and the second pseudo labels "brown acoustic guitar" 31' and "older man" 32' may be inserted into the integrated pseudo labels.

By referring again to FIG. 2, the training data generating device 1000 may generate the training data by annotating the original image with the at least one integrated pseudo label at a step of S400.

Thereafter, the generated training data may be used to retrain the models for generating the training data, and the process of auto-labeling a newly acquired unlabeled data set may be repeated.

The present disclosure has an effect of generating large-scale, high-quality training data by using a combination of Vision Language Model and a Vision Foundation Model.

The present disclosure has another effect of preventing an accumulation of incorrect labels through a filtering and a verification for outputs of the Vision Language Model and the Vision Foundation Model.

The present disclosure has still another effect of enabling rapid construction of high-quality, large-scale multi-domain data sets without a manual work, thereby reducing a cost and a time of the data construction in actual industrial and research fields.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media may include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device may work as more than a software module to perform the action of the present invention and they may do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for generating training data to be used for training a machine learning model, comprising:
   (a) in response to acquiring an original image, (i) performing, by a training data generating device, sub-processes of: generating an image caption for the original image by captioning the original image, extracting at least one noun phrase from the image caption, and performing an open vocabulary object detection on the original image by referring to the at least one noun phrase, to thereby generate at least one first pseudo label including at least one first category name and at least one first bounding box and (ii) performing, by the training data generating device, sub-processes of: extracting at least one proposal corresponding to at least one object from the original image, generating at least one region description corresponding to the at least one proposal, and generating at least one second pseudo label including at least one second category name and at least one second bounding box; and
   (b) filtering, by the training data generating device, the at least one first pseudo label and the at least one second pseudo label according to a preset filtering condition, to thereby generate at least one integrated pseudo label, and generating, by the training data generating device, the training data by annotating the original image with the at least one integrated pseudo label.

2. The method of claim 1, wherein, at the step of (b), the training data generating device filters the at least one first pseudo label and the at least one second pseudo label under at least one filtering condition among a first filtering condition, a second filtering condition, and a third filtering condition, wherein the first filtering condition is applied by calculating, for each of the at least one first pseudo label and the at least one second pseudo label, image-text align scores which include first align scores between the first category name and a first crop image corresponding to the first bounding box and second align scores between the second category name and a second crop image corresponding to the second bounding box, and removing at least one pseudo label corresponding to specific image-text align scores lower than or equal to a preset threshold score among the image-text align scores, wherein the second filtering condition is applied by removing, for each of the at least one first pseudo label and the at least one second pseudo label, at least one pseudo label whose bounding box size is smaller than or equal to a preset threshold size, and wherein the third filtering condition is applied by removing, for each of the at least one first pseudo label and the at least one second pseudo label, at least one pseudo label whose IOU between the first bounding box and the second bounding box is greater than or equal to a preset threshold IOU.

3. The method of claim 2, wherein, at the step of (b), the training data generating device calculates the image-text align scores through any one of a CLIP (Contrastive Language-Image Pre-training) model, a SigLIP (Sigmoid Loss for Language Image Pre-training)-2 model, a GLIP (Grounded Language-Image Pre-training) model, and a BLIP (Bootstrapping Language-Image Pre-training)-2 model under the first filtering condition.

4. The method of claim 2, wherein, at the step of (b), when filtering, according to the third filtering condition, a pseudo label corresponding to one of a specific first bounding box and a specific second bounding box, the IOU between the specific first bounding box and the specific second bounding box being greater than or equal to the preset threshold IOU, the training data generating device inserts one specific pseudo label corresponding to one specific bounding box, among the specific first bounding box and the specific second bounding box, which is matched with a task of the machine learning model into the at least one integrated pseudo label, by referring to a specific first category name corresponding to the specific first bounding box and a specific second category name corresponding to the specific second bounding box, and removes another specific pseudo label corresponding to another specific bounding box, among the specific first bounding box and the specific second bounding box, wherein the machine learning model is a model to be trained by using the training data.

5. The method of claim 1, wherein, at the step of (a), in performing the sub-process of generating the at least one first pseudo label, the training data generating device extracts the image caption for the original image through a first vision language model, extracts the at least one noun phrase from the image caption through a natural language processing model, and inputs the at least one noun phrase and the original image into an open vocabulary object detection model, to thereby instruct the open vocabulary object detection model to detect the at least one object corresponding to the at least one noun phrase in the original image.

6. The method of claim 1, wherein, at the step of (a), in performing the sub-process of generating the at least one second pseudo label, the training data generating device inputs the original image into an object proposal model, to thereby instruct the object proposal model to extract the at least one proposal corresponding to the at least one object from the original image, and inputs the at least one proposal and the original image into a second vision language model, to thereby instruct the second vision language model to generate the at least one region description for the at least one proposal.

7. A training data generating device for generating training data to be used for training a machine learning model, comprising:

at least one memory which saves instructions for generating the training data to be used for training the machine learning model; and at least one processor configured to generate the training data to be used for training the machine learning model according to the instructions stored in the memory to perform processes of: (I) in response to acquiring an original image, (i) performing sub-processes of: generating an image caption for the original image by captioning the original image, extracting at least one noun phrase from the image caption, and performing an open vocabulary object detection on the original image by referring to the at least one noun phrase, to thereby generate at least one first pseudo label including at least one first category name and at least one first bounding box and (ii) performing sub-processes of: extracting at least one proposal corresponding to at least one object from the original image, generating at least one region description corresponding to the at least one proposal, and generating at least one second pseudo label including at least one second category name and at least one second bounding box; and (II) filtering the at least one first pseudo label and the at least one second pseudo label according to a preset filtering condition, to thereby generate at least one integrated pseudo label, and generating the training data by annotating the original image with the at least one integrated pseudo label.

8. The training data generating device of claim 7, wherein, at the process of (II), the processor filters the at least one first pseudo label and the at least one second pseudo label under at least one filtering condition among a first filtering condition, a second filtering condition, and a third filtering condition, wherein the first filtering condition is applied by calculating, for each of the at least one first pseudo label and the at least one second pseudo label, image-text align scores which include first align scores between the first category name and a first crop image corresponding to the first bounding box and second align scores between the second category name and a second crop image corresponding to the second bounding box, and removing at least one pseudo label corresponding to specific image-text align scores lower than or equal to a preset threshold score among the image-text align scores, wherein the second filtering condition is applied by removing, for each of the at least one first pseudo label and the at least one second pseudo label, at least one pseudo label whose bounding box size is smaller than or equal to a preset threshold size, and wherein the third filtering condition is applied by removing, for each of the at least one first pseudo label and the at least one second pseudo label, at least one pseudo label whose IOU between the first bounding box and the second bounding box is greater than or equal to a preset threshold IOU.

9. The training data generating device of claim 8, wherein, at the process of (II), the processor calculates the image-text align scores through any one of a CLIP (Contrastive Language-Image Pre-training) model, a SigLIP (Sigmoid Loss for Language Image Pre-training)-2 model, a GLIP (Grounded Language-Image Pre-training) model, and a BLIP (Bootstrapping Language-Image Pre-training)-2 model under the first filtering condition.

10. The training data generating device of claim 8, wherein, at the process of (II), when filtering, according to the third filtering condition, a pseudo label corresponding to one of a specific first bounding box and a specific second bounding box, the IOU between the specific first bounding box and the specific second bounding box being greater than or equal to the preset threshold IOU, the processor inserts one specific pseudo label corresponding to one specific bounding box, among the specific first bounding box and the specific second bounding box, which is matched with a task of the machine learning model into the at least one integrated pseudo label, by referring to a specific first category name corresponding to the specific first bounding box and a specific second category name corresponding to the specific second bounding box, and removes another specific pseudo label corresponding to another specific bounding box, among the specific first bounding box and the specific second bounding box, wherein the machine learning model is a model to be trained by using the training data.

11. The training data generating device of claim 7, wherein, at the process of (I), in performing the sub-process of generating the at least one first pseudo label, the processor extracts the image caption for the original image through a first vision language model, extracts the at least one noun phrase from the image caption through a natural language processing model, and inputs the at least one noun phrase and the original image into an open vocabulary object detection model, to thereby instruct the open vocabulary object detection model to detect the at least one object corresponding to the at least one noun phrase in the original image.

12. The training data generating device of claim 7, wherein, at the process of (I), in performing the sub-process of generating the at least one second pseudo label, the processor inputs the original image into an object proposal model, to thereby instruct the object proposal model to extract the at least one proposal corresponding to the at least one object from the original image, and inputs the at least one proposal and the original image into a second vision language model, to thereby instruct the second vision language model to generate the at least one region description for the at least one proposal.

* * * * *